Jan. 14, 1958 W. H. COBBS, JR 2,819,985
REGENERATED CELLULOSE PACKAGING MATERIALS AND PROCESS
Filed Dec. 9, 1954
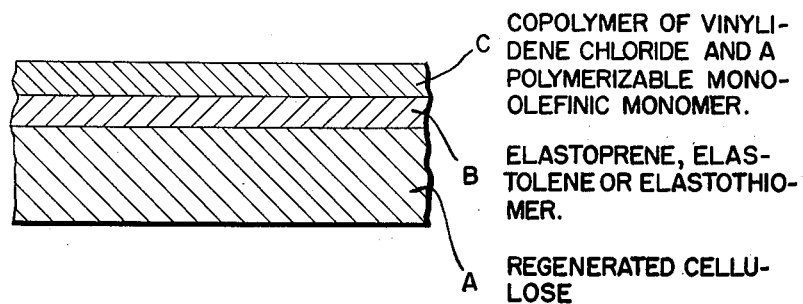
C — COPOLYMER OF VINYLIDENE CHLORIDE AND A POLYMERIZABLE MONO-OLEFINIC MONOMER.
B — ELASTOPRENE, ELASTOLENE OR ELASTOTHIOMER.
A — REGENERATED CELLULOSE
INVENTOR
WALTER HERBERT COBBS, JR
BY
ATTORNEY United States Patent Office 2,819,985
Patented Jan. 14, 1958

2,819,985
REGENERATED CELLULOSE PACKAGING MATERIALS AND PROCESS

Walter Herbert Cobbs, Jr., Grand Island, N. Y., assignor to E. I. du Pont de Nemours and Company, Wilmington, Del., a corporation of Delaware Application December 9, 1954, Serial No. 474,265

20 Claims. (Cl. 117—76)

This invention relates to the manufacture of regenerated cellulose film. More particularly, it relates to the production of regenerated cellulose film that is transparent, moistureproof, heat-sealable, durable and highly flexible; in short, improved regenerated cellulose packaging film suitable for conversion to bags, containers and similar packages.

The desired properties for transparent packaging materials are well known. They include strength, heat-sealability, durability of the heat-seal, flexibility and durability of the complete film, moisture-proofness, high gloss and clarity. Clarity, heat-sealability and moisture-proofness have been achieved and have contributed to making regenerated cellulose films important in the packaging field. These properties have been obtained by the use of coatings developed by the industry; one type of coating to render the films heat-sealable and enable packages to be formed, another type to render the packages moistureproof, and still others to adhere the previously mentioned coatings to the base film of regenerated cellulose. Then, as described in U. S. Patent 2,570,478, a process was developed to achieve heat-sealability, moistureproofness, adherence and other properties by the use of a single coating. However, despite the wealth of activity in this field, the durability and the flexibility of regenerated cellulose films still leave much to be desired. The inability of the films to withstand the normal abuse of shipping and handling makes handling goods wrapped in the films difficult and expensive.

The object of the present invention is to provide a novel packaging film of regenerated cellulose displaying high flexibility and excellent durability as well as moistureproofness, heat-sealability and clarity. A further object is to provide a process for preparing these improved regenerated cellulose packaging films. Other objects will appear hereafter.

The objects are accomplished by providing a base film of regenerated cellulose having at least one surface coated with two special coatings:

(1) A subcoating comprising an elastomer, selected from the group consisting of elastoprene, elastolene and elastothiomer, preferably an elastoprene.

(2) A top coating comprising a copolymer obtained from 80–97% vinylidene chloride and 3–20% of at least one other polymerizable mono-olefinic monomer copolymerizable therewith, preferably selected from the group consisting of alkyl acrylate and acrylonitrile.

The accompanying drawing illustrates in a cross-sectional view the novel packaging film of this invention. In the drawing the legend A identifies the base film of regenerated cellulose, and legends B and C indicate respectively, the subcoating (1), and the top coating (2) above described.

Preferably, the subcoating comprises a copolymer obtained from 40–80% butadiene and 20–60% of at least one other polymerizable compound selected from the group consisting of styrene and acrylonitrile and the top coating comprises a copolymer obtained from 80–97% vinylidene chloride and 3–20% of an alkyl acrylate. For optimum properties, the top coating should also contain 0.5–3%, based on the weight of vinylidene chloride and alkyl acrylate, of an unsaturated aliphatic acid from the group consisting of acrylic, methacrylic, and itaconic acids.

When used in this application, "elastoprene" refers to derivatives of butadiene as defined in H. L. Fisher's article, "Nomenclature of synthetic rubbers," Industrial and Engineering Chemistry, volume 31, page 941 (1939), and includes butadiene rubbers, piperylene rubbers, isoprene rubbers, dimethylbutadiene rubbers and haloprene rubbers. "Elastolene," as defined in the same article by Fisher and as used in the present application, encompasses polymers such as polyisobutylene. "Elastothiomer" encompasses the polyalkylene sulfides.

In a specific embodiment of this invention, a base film of regenerated cellulose was coated with two special coatings. Both coatings, in the form of aqueous dispersions, were applied by passing the base film through coating baths. In applying the subcoating, contact time of the base film and dispersion was kept at a minimum. Excess dispersion was doctored from the film surface.

The dispersions used for subcoatings are in general sold commercially, and can be applied directly without modification. The top coatings containing the vinylidene chloride copolymers were prepared by adding "Duponol" WAQ,[1] "Sulframin" AB,[2] ammonium persulfate, itaconic acid and water to a vessel fitted with a reflux condenser. After dissolving these components by stirring, vinylidene chloride and the alkyl acrylate or acrylonitrile were introduced and the mixture refluxed at 35° C. A solution of metal-sodium bisulfite was added and the mixture stirred until refluxing ceased, thereby indicating the completion of copolymerization. Subsequent to polymerization, "Duponol" WAQ or "Sulframin" AB may be added to stabilize the polymer against coagulation.

[1] Sodium salt of a fatty alcohol sulfate in aqueous solution (33% active ingredient).
[2] Sodium salt of an alkyl benzene sulfonate.

The subcoating containing a copolymer of approximately 60% butadiene and 40% acrylonitrile by weight, was applied from an aqueous dispersion (40% solids) known as "Hycar" 1551, manufactured by the B. F. Goodrich Chemical Company.

The top coating containing a copolymer of 94% vinylidene chloride, 6% methyl acrylate and 2%, based on the total weight of the previous two components, of itaconic acid was prepared from the following charge:

| | |
|---|---|
| Water | 120 pounds. |
| "Duponol" WAQ | 10 pounds. |
| Ammonium persulfate | 102 grams. |
| Vinylidene chloride | 140 pounds. |
| Methyl acrylate | 9 pounds. |
| Itaconic acid | 3 pounds. |
| Meta-sodium bisulfite | 51 grams in 1.5 lbs. water. |

Added subsequent to polymerization:
"Sulframin" AB _____ 3 lbs. in 10 lbs. of water A regenerated cellulose film .0012" thick was prepared substantially according to U. S. Patent 2,159,007 with ethylene glycol as a softener. The base film was passed through the glycol softening bath to incorporate into the film 20% by weight of ethylene glycol. The film was then subcoated by passing it through a bath of the first dispersion. Contact time with the dispersion was kept at a minimum. Excess dispersion was removed with doctor rolls to bring the coating to the desired thickness. The single-coated film was then dried in an atmosphere maintained at a temperature between 120° C. and 145° C. The top coating was then applied, smoothed and dried in a similar manner. The coating weight of the film totaled 7.5 grams/square meter; 2.6 grams of subcoat and 4.9 grams of top coat. The ethylene glycol remaining in the film comprised 14% of the final twice-coated film.

In the following table the properties of the resulting film are compared to those of a single-coated film:

TABLE I

| Film | Water Vapor Permeability (grams/100 sq. meters/hour) | Heat-Seal Strength (grams/1.5 in.) | Durability, as measured by a stress-flex text (Strokes) |
|---|---|---|---|
| Single-coated | 75 | 500 | 10 |
| Double-coated | 85 | 420 | 160 |

The details of the methods for testing the films follow:

Coating weight is determined by soaking the coated film in a hot solution of a sodium alkyl aryl sulfonate in acetic acid and stripping the coating from the regenerated cellulose film. The stripped coating in the form of a thin film is dried and weighed.

Moisture or water vapor permeability is determined by placing the test film over the top of an aluminum cup containing 15 milliliters of water, the test area being 33.3 square centimeters. The assembly is weighed accurately and then placed in a dry (less than 3% relative humidity) air-swept oven at 39.5° C. for 24 hours. The assembly is removed from the oven, cooled to room temperature and reweighed. The weight loss is converted to grams of water lost/100 square meter/hour.

Heat-signal strength is measured by cutting a piece of the coated film 4" x 10" with the grain running in the long or machine direction into two pieces 4" x 5" each. The two pieces are superimposed so that opposite surfaces are in contact. The two pieces of superimposed film are then sealed together at each end at right angles to the grain. A ¾" wide sealing bar heated to a temperature of 150° C. at 20 p. s. i. pressure contacts the ends for 2 seconds. The sealed sheets are then cut in half at right angles to the grain. From the center of the four resulting pieces, 1½" wide strips parallel to the grain are cut. After conditioning at 35% relative humidity and 75° F. for 72 hours, the four sets of strips are tested by opening each set of strips at the free ends, placing them in a Suter testing machine and pulling them apart. The highest force in grams required to pull the strips apart is taken as a measure of the heat-seal bond strength. Heat-seal strengths of 200 grams per 1.5 inches and above are considered adequate for most sealing purposes.

Durability is measured by the stress-flex test. The object of this test is to simulate the actual abuse suffered by the film during handling. Twenty pieces of film 4" x 7", the 7" dimension running in the machine direction of the film, are cut. After conditioning at 35% relative humidity and 75° F. for 72 hours, they are inserted between rubber faced clamps, the 7" dimension running parallel to the jaws of the clamps. One clamp is stationary and the opposite clamp is weighted and permitted to move in a plane parallel to the plane of the film by rotating the apparatus. The number of strokes recorded before the sample breaks is termed the stress-flex value and is a direct measure of the film's durability.

Table II, which follows, summarizes the examples of this invention. Example 1 is outside the scope of the invention and is presented for comparison.

The films were prepared essentially in the manner described previously. The regenerated cellulose film was passed through an aqueous softening bath containing ethylene glycol and, in some cases as indicated, a guanidine-urea-formaldehyde polymer. The purpose and use of the guanidine-urea-formaldehyde polymer are disclosed in U. S. Patent 2,533,557. The resulting film, containing approximately 20% by weight of ethylene glycol and, in some cases, 0.5% by weight of the guanidine-urea-formaldehyde polymer, was passed over a tensioning roll and under a guide roll into tanks containing the coating compositions. After each application of coating, the film was passed between two doctor rolls to smooth the coating and to regulate its thickness. The single-coated film and then the double-coated film were dried in a tower maintained at a temperature between 120° C.–160° C. The final twice-coated film contained from 12% to about 20% ethylene glycol.

The coating compositions were prepared substantially as described for the specific embodiment. The amounts of polymer components are given in the examples in weight percentages. The percentages of acid (itaconic, acrylic or methacrylic) are based on the total weight of the major components. Thus, to prepare a copolymer from 94% vinylidene chloride, 6% alkyl acrylate and 2% itaconic acid using 47 pounds of vinylidene chloride, one employs 3 pounds of alkyl acrylate and 1 pound of itaconic acid.

For convenience, abbreviations and commercial names have been used in the table. Unless otherwise stated, the commercial products are in the form of aqueous dispersions. "Hycar" 1551 is a butadiene/acrylonitrile copolymer containing 60% butadiene and made by the B. F. Goodrich Chemical Co.; "Chemigum" 235A, a butadiene/acrylonitrile copolymer containing 62% butadiene and made by the Goodyear Tire and Rubber Co.; "Chemigum" 245 AHS, a butadiene/acrylonitrile copolymer containing 67% butadiene and made by the Goodyear Tire and Rubber Co.; Neoprene 571, a polymer of chloroprene made by E. I. du Pont de Nemours & Co.; Dow Latex 546, a polymer of butadiene and styrene containing about 60% butadiene and made by the Dow Chemical Co.; "Darex" 9L, a butadiene/styrene copolymer containing 30% butadiene and made by Dewey & Almy Co.; "Nitrex" 2612, a butadiene/acrylic copolymer made by the Naugatuck Chemical Division of the U. S. Rubber Co.; "Thiokol" MX, a rubbery polyalkylene sulfide prepared by reacting ethylene dichloride and sodium polysulfide to produce a product having the empirical formula $(C_4H_8S_4)_n$, made by the Thiokol Corp.; g., grams; m., meters; in., inches.

TABLE II
Properties of coated regenerated cellulose films

| Example | Base Film, Percent Resin [1] | Subcoating | | Top Coating [3] Weight, g./m.² | Final Film | | Moisture Permeability, g./100 m.²/hr. | Heat-Seal Strength, g./1.5 in. | Durability (Strokes) |
| --- | --- | --- | --- | --- | --- | --- | --- | --- | --- |
| | | Composition | Weight, g./m.² | | Percent Softener [2] | Percent Water | | | |
| 1 | 0.5 | None | | 5.0 | 19.0 | 7.0 | 75 | 500 | 10 |
| 2 | 0.5 | "Chemigum" 235A | 6.3 | 5.6 | 19.0 | 6.0 | 75 | 460 | 120 |
| 3 | None | "Darex" 9L | 3.6 | 3.5 | 18.0 | 5.0 | 110 | 260 | 100 |
| 4 | None | Neoprene 571 | 2.5 | 5.0 | 16.0 | 6.0 | 80 | 220 | 50 |
| 5 | None | Dow Latex 546 | 5.0 | 6.0 | 14.0 | 5.0 | 90 | 200 | 120 |
| 6 | 0.5 | Dow Latex 546 | 6.0 | 5.0 | 12.0 | 5.0 | 75 | 230 | 125 |
| 7 | None | "Chemigum" 245 AHS | 3.8 | 11.0 | 16.0 | 4.0 | 60 | 230 | 130 |
| 8 | 0.5 | "Chemigum" 245 AHS | 3.8 | 12.0 | 12.0 | 4.0 | 60 | 330 | 70 |
| 9 | None | "Hycar" 1551 | 2.6 | 4.9 | 14.0 | 4.0 | 85 | 420 | 160 |
| 10 | 0.5 | "Hycar" 1551 | 1.4 | 3.9 | 15.0 | 4.0 | 100 | 340 | 50 |
| 11 | None | "Nitrex" 2612 | 4.8 | 8.4 | 13.0 | 5.0 | 65 | 590 | 50 |
| 12 | 0.5 | "Thiokol" MX | 4.0 | 6.0 | 19.0 | 7.0 | 95 | 300 | 60 |

[1] Guanidine-urea-formaldehyde polymer.
[2] Ethylene glycol. 20% by weight is incorporated in the base film prior to coating.
[3] An aqueous dispersion of 94/6/2 vinylidene chloride/methyl acrylate/itaconic acid copolymer.

In the following examples, Examples 13-17, either one or both coatings were applied from organic solutions instead of aqueous dispersions. The regenerated cellulose base sheet contained 20.5% ethylene glycol as a softener and except for Example 17, approximately 0.5% guanidine-urea-formaldehyde resin.

EXAMPLE 13

Regenerated cellulose film, .0017" thick, was coated first with a 15% solids solution of "Pliolite" S-7 in toluene. "Pliolite" S-7 is a butadiene/styrene copolymer manufactured by Goodyear Tire Rubber Co. After drying, the subcoated film was top coated with a 10% solids solution of 90/10-vinylidene chloride/acrylonitrile copolymer in 65/35-methyl ethyl ketone/toluene. The subcoat and top coat weights were 10 and 17 grams/square meter respectively. The resulting film had a stress-flex durability of 170 strokes and a heat-seal strength of over 600 grams/1.5 inches.

EXAMPLES 14 AND 15

In these examples, regenerated cellulose film was first coated with a 35% solids "Hycar" 1577 aqueous dispersion. "Hycar" 1577 is a butadiene/acrylonitrile copolymer containing 73% butadiene, manufactured by the B. F. Goodrich Chemical Co. After drying in an atmosphere maintained at 125-160° C., the subcoated film was coated with a 10% solids solution of a 90/10-vinylidene chloride/acrylonitrile copolymer in 65/35-methyl ethyl ketone/ toluene. In Example 14, the cellulose base film thickness was .0012 inch and in Example 15, .0017 inch. The subcoat and top coat weights in both examples were 7.0 and 5.0 grams/square meter respectively. The following results were obtained:

| Example No. | Water Vapor Permeability, g./100 m²/hr. | Heat-Seal Strength, g./1.5 in. | Stress-Flex Durability, Strokes |
| --- | --- | --- | --- |
| 14 | 75 | over 600 | 110 |
| 15 | 75 | over 600 | 180 |

EXAMPLE 16

In this example, regenerated cellulose film, .0017" thick, was subcoated with a 35% solids "Hycar" 1577 aqueous dispersion and top coated with 10/90-vinylidene chloride/acrylonitrile copolymer. The top coat was applied from a solution in 65/35 methyl ethyl ketone/toluene. The solution also contained 10% dibutyl phthalate, based on the weight of the vinylidene chloride/acrylonitrile copolymer as a plasticizer. The subcoat and top coat weights were 9.0 and 10.0 grams/square meter respectively. The final coated film displayed a stress-flex durability of 190 strokes, a heat-seal strength of over 1,000 grams/1.5 inches and a moisture permeability value of 55 grams/100 meters²/hour.

EXAMPLE 17

Regenerated cellulose film, .0012" thick and containing no resin, was subcoated with a 10% solids solution of "Vistanex" B-80 in benzene. "Vistanex" B-80 is polyisobutylene manufactured by Enjay Corporation. After evaporation of the benzene, the subcoated film was top coated with a 48% solids aqueous dispersion of 94/6/2-vinylidene chloride/methyl acrylate/itaconic acid coplymer. The total weight of both subcoat and top coat was 12.9 grams/square meter. The final double-coated film displayed a stress-flex durability of 91 strokes and a heat-seal strength of 120 grams/1.5 inches.

From the foregoing examples it is evident that by using the present invention, the durability of regenerated cellulose film may be improved from five-to sixteen-fold without any substantial increase in moisture permeability or any substantial decrease in heat-seal strength. The improvement is achieved by coating the base film of regenerated cellulose with two critical coatings, namely; a subcoating comprising an elastomer selected from the group consisting of elastoprene, elastolene and elastothiomer, preferably an elastoprene, and a top coating comprising a copolymer obtained from 80-97% vinylidene chloride and 3-20% of at least one other polymerizable mono-olefinic monomer copolymerizable with vinylidene chloride. The base film may also contain softeners and resins. The coatings may contain pigments, dyes, delustrants, plasticizers, etc., if desired.

The moisture impermeability of the film of this invention is contributed by the top coating composition; a hard polymer prepared from at least 80% vinylidene chloride and 3-20% of at least one other polymerizable mono-olefinic monomer copolymerizable therewith. As polymerizable monomers for use with the vinylidene chloride in the top coating the, examples disclose the use of an alkyl acrylate and acrylonitrile. However, the invention is not limited to these. Any monomer which will copolymerize with vinylidene chloride may also be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methyl-propyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U. S. Patent 2,160,943. These compounds may be described as vinyl or vinylidene compounds having a single $CH_2=C<$ group. The most useful ones fall within the general formula

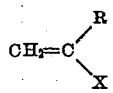

where R may be hydrogen, a halogen or a saturated aliphatic radical and X is selected from one of the following groups:

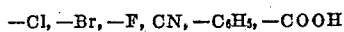

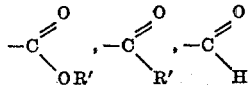

$-OC_6H_5$, $-CONH_2$, $-CONH-R'$, and $-CONR_2'$, in which R' is alkyl.

The coatings may be applied from aqueous or organic vehicles, i. e. in the form of aqueous dispersions or from solutions of the polymers in organic solvents. For optimum properties, unsaturated aliphatic acids such as itaconic acid, acrylic acid and methacrylic acid may be incorporated in the top coating compositions. While the examples illustrate the use of itaconic acid in the top coating composiitons, substantially equivalent quantities of either acrylic acid or methacrylic acid used in place of itaconic acid produce similar results. When the top coating compositions are applied from organic solutions, the acid may be omitted with little deleterious effect. When coating from aqueous dispersions, the acid may also be omitted if steps are taken to facilitate wetting the film by using commercial wetting agents or other methods. It should be pointed out that films top coated with compositions that do not include the unsaturated aliphatic acids are somewhat inferior in the degree of transparency. For this reason, it is preferred to include one of the above unsaturated aliphatic acids in the top coating compositions.

The coatings may be applied in accordance with any known coating techniques. They may be applied by passing the film through baths in a continuous manner or in a batch manner. Coatings may also be sprayed on the film, or applied manually by brushing or the like. The thickness of the coatings may be adjusted in accordance with methods well known in the coating art. Selection of the proper thicknesses of the top coating and the subcoating depends to some extent on the properties that one desires to emphasize. Thus, the thickness of the subcoating influences the strength and durability of the heat-seal and the durability of the film in general. The thickness of the top coating influences the permeability of the film to moisture and gases.

The double-coated films of this invention are useful as moistureproof packaging materials for foods, cigarettes and the like. Their high flexibility, superior durability and impermeability to water vapor and gases combine to provide wrapping materials that can withstand the abuse of handling and shipping and wherein the freshness of the products may be retained over long periods. Because of these superior properties the films are outstanding as a vacuum and pressure packaging material for packaging luncheon meats, cheeses, nuts, etc.

As many widely different embodiments may be made without departing from the spirit and scope of this invention, it is understood that the invention is not limited except as defined in the appended claims.

What is claimed is:

1. A packaging film comprising a base film of regenerated cellulose having at least one surface coated with a subcoating comprising an elastomer selected from the group consisting of elastoprene, elastolene and elastothiomer, and a top coating comprising a copolymer obtained from 80-97% vinylidene chloride and 3-20% of at least one other polymerizable mono-olefinic monomer copolymerizable with vinylidene chloride.

2. A packaging film comprising a base film of regenerated cellulose having at least one surface coated with a subcoating comprising an elastoprene and a top coating comprising a copolymer obtained from 80-97% vinylidene chloride and 3-20% of a least one other polymerizable mono-olefinic monomer copolymerizable with vinylidene chloride.

3. A packaging film comprising a base film of regenerated cellulose having at least one surface coated with a subcoating comprising an elastomer selected from the group consisting of elastoprene, elastolene and elastothiomer, and a top coating comprising a copolymer obtained from 80-97% vinylidene chloride an 3-20% of at least one other polymerizable mono-olefinic monomer selected from the group consisting of alkyl acrylate and acrylonitrile.

4. A packaging film comprising a base film of regenerated cellulose having at least one surface coated with a subcoating comprising an elastoprene and a top coating comprising a copolymer obtained from 80-97% vinylidene chloride and 3-20% of at least one other polymerizable mono-olefinic monomer selected from the group consisting of alkyl acrylate and acrylonitrile.

5. A packaging film comprising a base film of regenerated cellulose having at least one surface coated with a subcoating comprising a copolymer obtained from 40-80% butadiene and 20-60% of at least one other polymerizable compound from the group consisting of acrylonitrile and styrene and a top coating comprising a copolymer obtained from 80-97% vinylidene chloride, 3-20% of at least one other polymerizable mono-olefinic monomer selected from the group consisting of alkyl acrylate and acrylonitrile.

6. A packaging film comprising a base film of regenerated cellulose having at least one surface coated with a subcoating comprising a copolymer obtained from 40-80% butadiene and 20-60% of at least one other polymerizable compound from the group consisting of acrylonitrile and styrene and a top coating comprising a copolymer obtained from 80-97% vinylidene chloride and 3-20% alkyl acrylate.

7. A packaging film as in claim 6 wherein the alkyl acrylate in the top coating is methyl acrylate.

8. A packaging film comprising a base film of regenerated cellulose having at least one surface coated with a subcoating comprising a copolymer obtained from 40-80% butadiene and 20-60% of at least one other polymerizable compound from the group consisting of acrylonitrile and styrene and a top coating comprising a copolymer obtained from 80-97% vinylidene chloride, 3-20% alkyl acrylate and 0.5-3%, based on the total weight of the previous components, of an unsaturated aliphatic acid from the group consisting of itaconic acid, acrylic acid and methacrylic acid.

9. A packaging film as in claim 8 wherein the unsaturated aliphatic acid in the top coating is itaconic acid.

10. A process for preparing a packaging film which comprises coating a base film of regenerated cellulose with an elastomer selected from the group consisting of elastoprene, elastolene and elastothiomer; drying the coated base film; applying to the dried coated film a second coating comprising a copolymer obtained from 80-97% vinylidene chloride and 3-20% of at least one other polymerizable mono-olefinic monomer copolymerizable with vinylidene chloride; and drying the twice-coated film.

11. A process for preparing a packaging film which comprises coating a base film of regenerated cellulose with an elastoprene; drying the coated base film; applying to the dried coated film a second coating comprising a copolymer obtained from 80–97% vinylidene chloride and 3–20% of at least one other polymerizable mono-olefinic monomer copolymerizable with vinylidene chloride; and drying the twice-coated film.

12. A process for preparing a packaging film which comprises coating a base film of regenerated cellulose with an elastomer selected from the group consisting of elastoprene, elastolene and elastothiomer; drying the coated base film; applying to the dried coated film a second coating comprising a copolymer obtained from 80–97% vinylidene chloride and 3–20% of at least one other polymerizable mono-olefinic monomer selected from the group consisting of alkyl acrylate and acrylonitrile; and drying the twice-coated film.

13. A process for preparing a packaging film which comprises coating a base film of regenerated cellulose with an elastoprene; drying the coated base film; applying to the dried coated film a second coating comprising a copolymer obtained from 80–97% vinylidene chloride and 3–20% of at least one other polymerizable mono-olefinic monomer selected from the group consisting of alkyl acrylate and acrylonitrile and drying the twice-coated film.

14. A process for preparing a packaging film which comprises coating a base film of regenerated cellulose with a copolymer obtained from 40–80% butadiene and 20–60% of at least one other polymerizable compound from the group consisting of acrylonitrile and styrene; drying the coated base film; applying to the dried coated film a second coating comprising a copolymer obtained from 80–97% vinylidene chloride, 3–20% of at least one other polymerizable mono-olefinic monomer selected from the group consisting of alkyl acrylate and acrylonitrile; and drying the twice-coated film.

15. A process for preparing a packaging film which comprises coating a base film of regenerated cellulose with a copolymer obtained from 40–80% butadiene and 20–60% of at least one other polymerizable compound from the group consisting of acrylonitrile and styrene; drying the coated base film; applying to the dried coated film a second coating comprising a copolymer obtained from 80–97% vinylidene chloride and 3–20% alkyl acrylate; and drying the twice-coated film.

16. A process for preparing a packaging film as in claim 15 wherein the alkyl acrylate in the second coating is methyl acrylate.

17. A process for preparing a packaging film which comprises coating a base film of regenerated cellulose with a copolymer obtained from 40–80% butadiene and 20–60% of at least one other polymerizable compound from the group consisting of acrylonitrile and styrene; drying the coated base film; applying to the dried coated film a second coating comprising a copolymer obtained from 80–97% vinylidene chloride, 3–20% alkyl acrylate and 0.5–3%, based on the total weight of the previous components, of an unsaturated aliphatic acid from the group consisting of itaconic acid, acrylic acid and methacrylic acid; and drying the twice-coated film.

18. A process for preparing a packaging film as in claim 17 wherein the unsaturated aliphatic acid in the second coating is itaconic acid.

19. A process for preparing a packaging film which comprises coating regenerated cellulose film with a copolymer obtained from 40–80% butadiene and 20–60% acrylonitrile; drying the coated film; applying to the dried coated film a second coating comprising a copolymer obtained from 94% vinylidene chloride, 6% methyl acrylate and 2%, based on the weight of vinylidene chloride and methyl acrylate, of itaconic acid; and drying the twice-coated film.

20. A process for preparing a packaging film which comprises coating regenerated cellulose film with a copolymer obtained from 40–80% butadiene and 20–60% acrylonitrile; drying the coated film; applying to the dried coated film a second coating comprising a copolymer obtained from 80–97% vinylidene chloride, 3–20% of at least one other polymerizable mono-olefinic monomer selected from the group consisting of alkyl acrylate and acrylonitrile and 10%, based on the total weight of the previous components, of dibutyl phthalate; and drying the twice-coated film.

References Cited in the file of this patent

UNITED STATES PATENTS

| | | |
|---|---|---|
| 2,556,885 | Ness | June 12, 1951 |
| 2,684,919 | Berry | July 27, 1954 |
| 2,705,691 | Panagross | Apr. 5, 1955 |
| 2,787,557 | Christensen | Apr. 2, 1957 |

FOREIGN PATENTS

| | | |
|---|---|---|
| 500,178 | Canada | Feb. 23, 1954 |

UNITED STATES PATENT OFFICE
CERTIFICATE OF CORRECTION

Patent No. 2,819,985 January 14, 1958

Walter Herbert Cobbs, Jr.

It is hereby certified that error appears in the printed specification of the above numbered patent requiring correction and that the said Letters Patent should read as corrected below.

Column 2, line 51, for "metal-sodium bisulfite" read -- meta-sodium bisulfite --; column 3, line 65, for "Heat-signal strength" read -- Heat-seal strength --; column 4, line 73, for "$(C_4H_3S_4)_n$" read $(C_4H_8S_4)_n$ --; column 5, line 33, for "Goodyear Tire Rubber Co." read -- Goodyear Tire and Rubber Co. --; column 6, line 59, for "coating the, examples" read -- coating, the examples --; column 7, line 17, for "CN," read -- -CN, --; column 8, line 20, claim 3, for "an 3-20%" read -- and 3-20% --.

Signed and sealed this 8th day of April 1958.

(SEAL)
Attest:

KARL H. AXLINE
Attesting Officer

ROBERT C. WATSON
Commissioner of Patents